United States Patent [19]
Kaneko

[11] Patent Number: 5,547,139
[45] Date of Patent: Aug. 20, 1996

[54] FISHLINE GUIDE MECHANISM FOR SPINNING REEL

[75] Inventor: Kyoichi Kaneko, Tokyo, Japan

[73] Assignee: Daiwa Seiko, Inc., Tokyo, Japan

[21] Appl. No.: 503,880

[22] Filed: Jul. 18, 1995

Related U.S. Application Data

[63] Continuation of Ser. No. 136,695, Oct. 15, 1993, abandoned.

[30] Foreign Application Priority Data

Oct. 16, 1992 [JP] Japan .................. 4-078162 U

[51] Int. Cl.$^6$ .................................. A01K 89/01
[52] U.S. Cl. ............................. 242/231; 242/321
[58] Field of Search .................... 242/230, 231, 242/232, 233, 321; 384/192, 206; 254/413, 415

[56] References Cited

U.S. PATENT DOCUMENTS

| | | | |
|---|---|---|---|
| 3,342,442 | 9/1967 | Brantingson | 242/233 |
| 3,804,350 | 4/1974 | Williams | 254/415 X |
| 4,301,995 | 11/1981 | Niskin | 254/415 X |
| 4,562,976 | 1/1986 | Ban | 384/206 X |
| 4,747,810 | 5/1988 | Shepley et al. | 384/206 X |
| 5,261,627 | 11/1993 | Shinohara | 242/231 |
| 5,379,958 | 1/1995 | Takeuchi | 242/232 |

FOREIGN PATENT DOCUMENTS

| | | | |
|---|---|---|---|
| 1406696 | 6/1965 | France | 242/231 |
| 521222 | 7/1957 | Italy | 242/232 |
| 30149 | 8/1974 | Japan | 242/232 |
| 58-194680 | 12/1983 | Japan . | |
| 498460 | 1/1939 | United Kingdom | 242/232 |

*Primary Examiner*—Joseph J. Hail, III
*Attorney, Agent, or Firm*—Longacre & White

[57] ABSTRACT

In a fishline guide mechanism for a spinning reel, in which a fishline is guided on a guide surface of a rotatable guide roller which is supported on a bail support member so as to be tiltable about its rotational center depending on a direction of force applied to the fishline, a distance between lateral ends of the guide surface is made greater than a distance between opposing distal ends of annular projections provided on the support member, and further a clearance between an inner surfaces of each guide projection and corresponding lateral end of the guide surface is maintained at substantially the same constant amount even when the guide roller is tilted relative to the support member, in order to prevent the fishline from entering and clogging into the clearance, and coming off from the fishline guide surface.

9 Claims, 5 Drawing Sheets

FISHLINE GUIDE MECHANISM FOR SPINNING REEL

This is a continuation of application Ser. No. 08/136,695, filed Oct. 15, 1993, which was abandoned upon the filing hereof.

BACKGROUND OF THE INVENTION

The present invention relates to an improvement for a fishline guide mechanism of a spinning reel.

There has been recognized a problem in a fishline guide mechanism provided in a spinning reel that a fishline guide roller provided in a bail support member applies an irregular force to a fishline during the course of winding operation, which results in the twist of the fishline, un-uniform winding of the fishline on the spool, the permanent wave phenomenon on the fishline, and the possibility of the cut of the fishline, since the winding direction is varied depending on the diameter of the fishline wound on the spool. To solve this problem, Japanese Utility Model Unexamined Publication Sho. 58-19468 discloses an automatic alignment system in which a rotatable fishline guide roller is supported on a bail support member so as to be tiltable about its rotational center.

However, the automatic alignment system for the guide roller suffers from another problem in that a clearance between a peripheral one end of the fishline guide roller and an annular projection of the support member is increased when the fishline guide roller is tilted, so that the fishline is likely to enter and clog into the increased clearance. At the other peripheral end of the fishline guide roller, the fishline is likely to come off from a guide portion of the guide roller and ride on the other portion outward from the guide portion.

SUMMARY OF THE INVENTION

In order to solve the problems found in the prior art, the present invention provides a fishline guide mechanism in which a fishline is guided on a guide surface of a rotatable guide roller which is supported on a bail support member so as to be tiltable about its rotational center depending on a direction of force applied to the fishline, the guide surface having lateral ends, and the support member having a pair of annular projections opposite to each other and defining inner surfaces opposite to the guide roller. The fishline guide mechanism is characterized in that: a first distance defined between the lateral ends of the guide surface is greater than a second distance defined between opposing distal ends of the annular projections. A clearance may be formed between one of the inner surfaces of the guide projections and corresponding one of the lateral ends of the guide surface as long as it is maintained at substantially the same constant amount even when the guide roller is tilted relative to the support member.

Preferably, each of the inner surfaces of the projections is formed as a part of a circle whose center is coincident with the rotational and tilting center of the guide roller. Each of the inner surfaces of the projections may be of step-wise. The guide surface may include a fishline guide main portion in the form of groove and auxiliary portion located at both side of the main portion, through which the fishline is guided into the main portion.

The present invention further provides a fishline guide mechanism in which a fishline is guided on a guide surface of a rotatable guide roller which is supported on a bail support member so as to be tiltable about its rotational center depending on a direction of force applied to the fishline, the guide surface having lateral ends, and the support member having a pair of annular projections opposite to each other and defining inner surfaces opposite to the guide roller, characterized in that: a first distance defined between the lateral ends of the guide surface is greater than a second distance defined between opposing distal ends of the annular projections; and a clearance defined between one of the inner surfaces of the guide projections and corresponding one of the lateral ends of the guide surface is decreased as the guide roller is tilted to move the one lateral end of the guide surface nearer to the distal end of the annular projection. The one lateral end of the guide surface may be brought into contact with corresponding one of the inner surfaces of the guide projections to close the clearance.

The present invention further provides a fishline guide mechanism for a fishing reel, which includes: a bail support member having a spherical inner surface; and a guide roller formed with a fishline guide surface and supported by the spherical inner surface at lateral ends of the fishline guide surface so as to be rotatable and tiltable with respect to the bail support member. The spherical inner surface is defined by a pair of annular projections provided on the bail support member and deviated from each other at a first distance over the fishline guide surface. The first distance is smaller than a second distance defined between the lateral ends of the fishline guide surface. Preferably, a low-friction coating is applied on at least one of the spherical inner surface and a portion of the guide roller which is bought into contact with the spherical surface.

DETAILED DESCRIPTION OF THE PREFERRED EMBODIMENTS

Preferred embodiments of the present invention will now be described in detail with reference to the drawings attached hereto.

Figure 1:
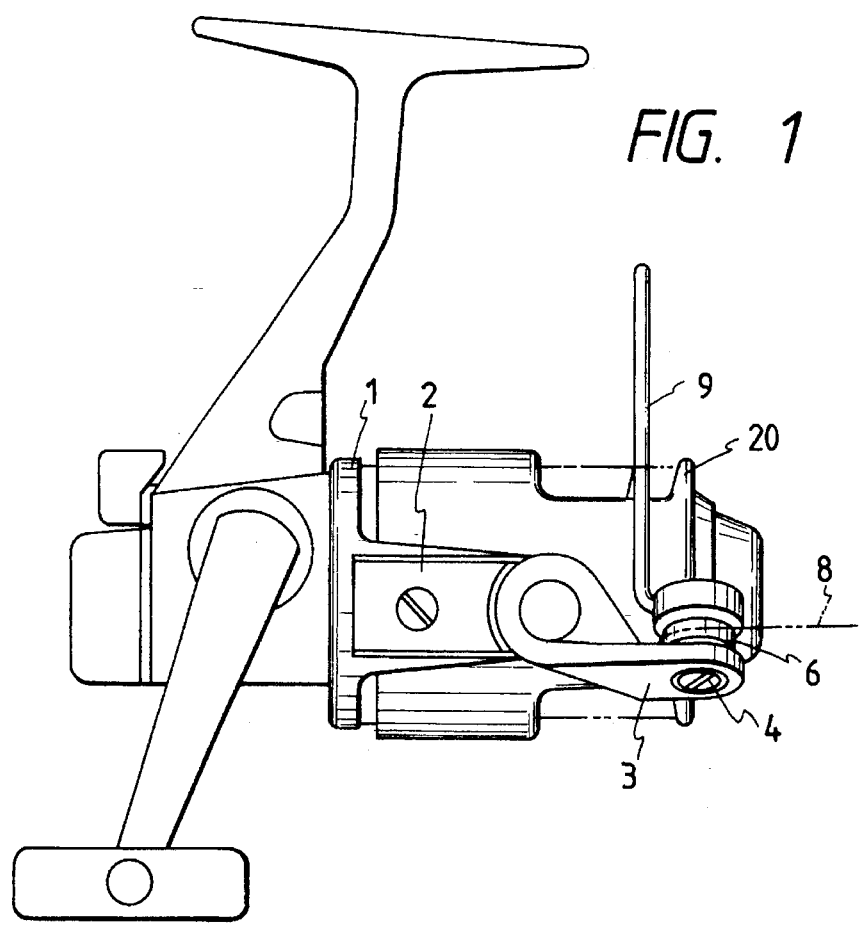
FIG. 1 is a front view showing a spinning reel for fishing into which a fishline guide mechanism according to an embodiment of the present invention is incorporated.
Figure 2:
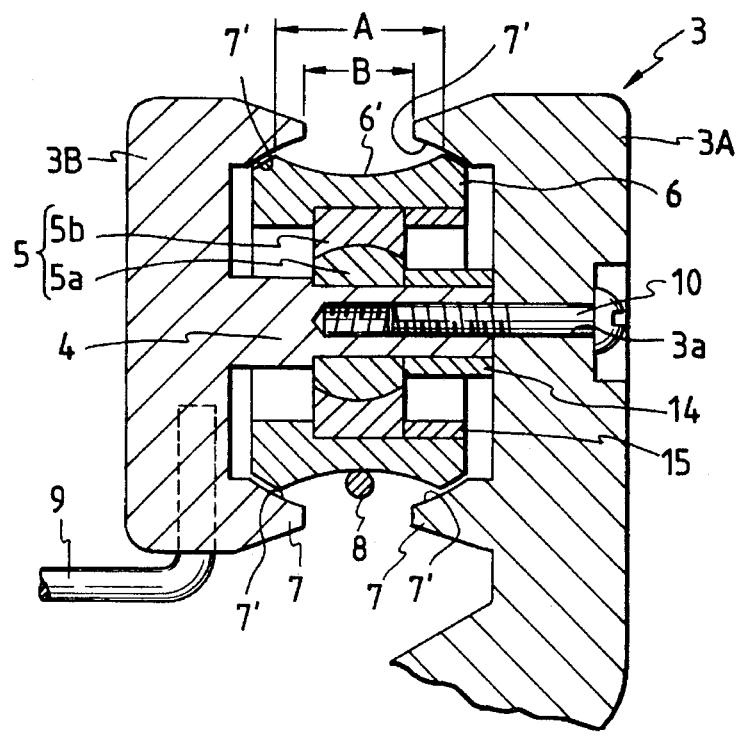
FIG. 2 is a cross-sectional view showing major parts of the fishline guide mechanism.
Figure 3:
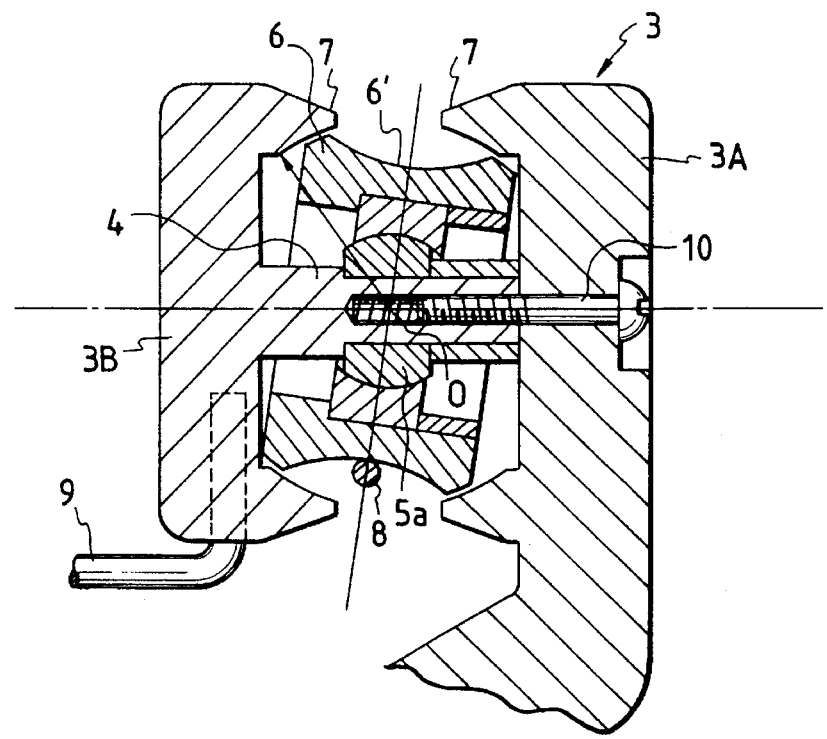
FIG. 3 is a cross-sectional view showing the major parts in a state, that a guide roller is tilted.

FIGS. 1 to 3 show a fishline guide mechanism for a spinning reel according to a first embodiment of the present invention. In the spinning reel, a bail support member 3 having a bail 9 is pivotably supported on a support arm 2 provided on a rotor 1. The bail support member 3 is made up of a first support member 3A pivotably supported on the support arm 2 and a second support member 3B to which the bail 9 is fixed. The first support member 3A has a through hole 3a whereas the second support member 3B has a support shaft 4. A mounting screw 10 passing through the hole 3a is threadingly engaged with the support shaft 4 to secure the second support member 3B to the first support member 3A. An inner race member 5a of a spherical surface bearing 5 and a collar 14 are fitted on the support shaft 4. The collar 14 and a step of the support shaft 4 retain the inner race member 5a in place. A fishline guide roller 6 with a fishline guide portion 6' formed into a substantially arcuate concave configuration is fitted on an outer race member 5b of the spherical surface bearing 5 and retained in place by a collar 15. Thus, the fishline guide roller 6 is rotatably supported and rocked on the support shaft 4 through the spherical surface bearing 5. In this embodiment, the fishline guide portion 6' is U-shaped, but it may be other concave configuration in cross-section, such as a V-shape or the like. Each of the first and second bail support members 3A and 3B is formed with an annular projection 7 in such a manner that a distance A defined by lateral terminal ends of the fishline guide portion 6' is greater than a distance B defined by inner opposing ends of projections 7 when the first and second members 3A and 3B are coupled together. Preferably, as best shown in FIG. 3, the dimensional relationship between the distance A and the distance B is so selected that the lateral end of the fishline guide portion 6' is prevented from being moved beyond the inner end of the projection 7 even when the guide roller 6 is tilted maximum. Further, each of the projections 7 defines an inner circumferential surface 7' a distance from which to the corresponding lateral end of the fishline guide surface 6' is maintained at the substantially the same small constant value even when the guide roller 6 is rotated and/or rocked on the support shaft 4. Preferably, the inner circumferential surface 7' is so formed as to be a part of a circle whose center is coincident with a rotating and rocking center O of the fishline guide roller 6 as best shown in FIG. 3.

Since the fishline guide mechanism according to the embodiment is constructed as mentioned above, it is possible to surely prevent the lateral end of the fishline guide portion 6' from entering into a gap between the opposing ends of the collars 7 of the bail support member 3 and also to maintain the distance between the end of the fishline guide portion 6' and the inner circumferential surface 7' of the collar 7 at the substantially the same small constant value, even when the guide roller 6 is tilted due to the influence of the tension of the fishline 8 as shown in FIG. 3. Thus, this arrangement surely prevent the fishline 8 from coming off from the fishline guide portion 6', entering or clogging into the clearance between the support member 3 and the roller 6, tangling onto the support shaft 4, raising out of the fishline guide portion 6' onto the support member 3.

Figure 4:
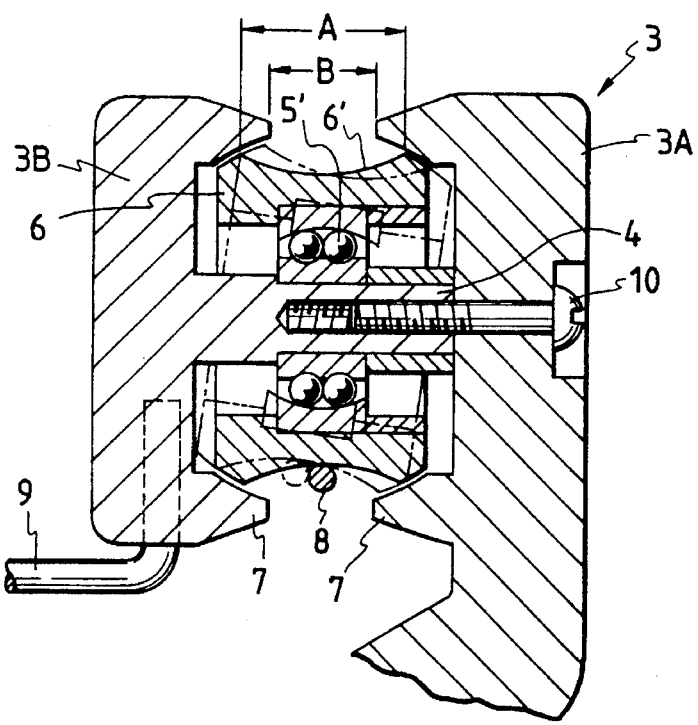
FIG. 4 is a cross-sectional view showing major parts of a fishline guide mechanism according to a second embodiment of the invention.
Figure 5:
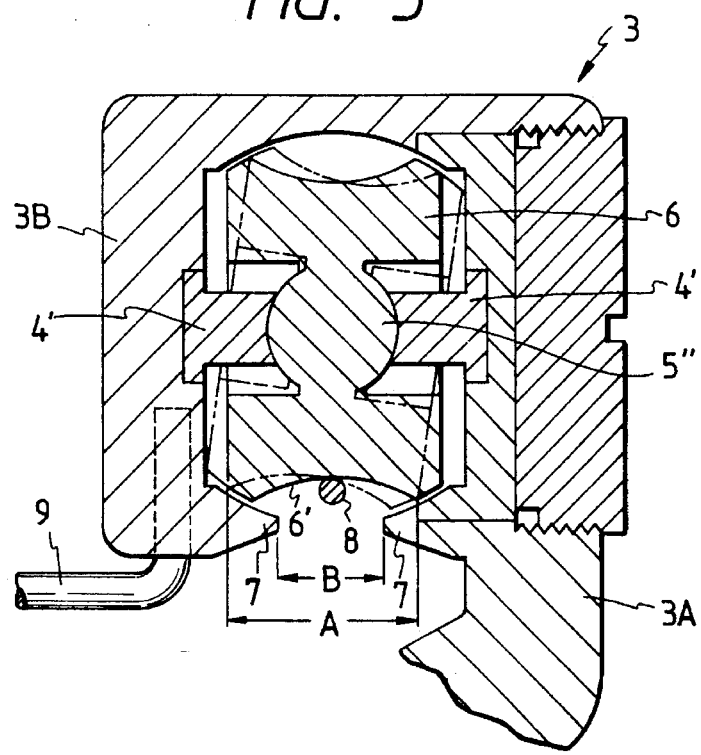
FIG. 5 is a cross-sectional view showing major parts of a fishline guide mechanism according to a third embodiment of the invention.

FIG. 4 shows another embodiment in which the fishline guide roller 6 is rotatably supported on an automatic aligning ball-bearing 5'. FIG. 5 shows yet another embodiment in which a ball portion 5" is formed in the fishline guide roller at its central portion and the ball portion 5" is supported by center pins 4' axially projecting from the first and second support members 3A and 3B, respectively. In this embodiment shown in FIG. 5, the first and second support members 3A and 3B are coupled together using a portion of the second support member 3B, which is located radially outward relative to the guide roller 6.

Figure 6:
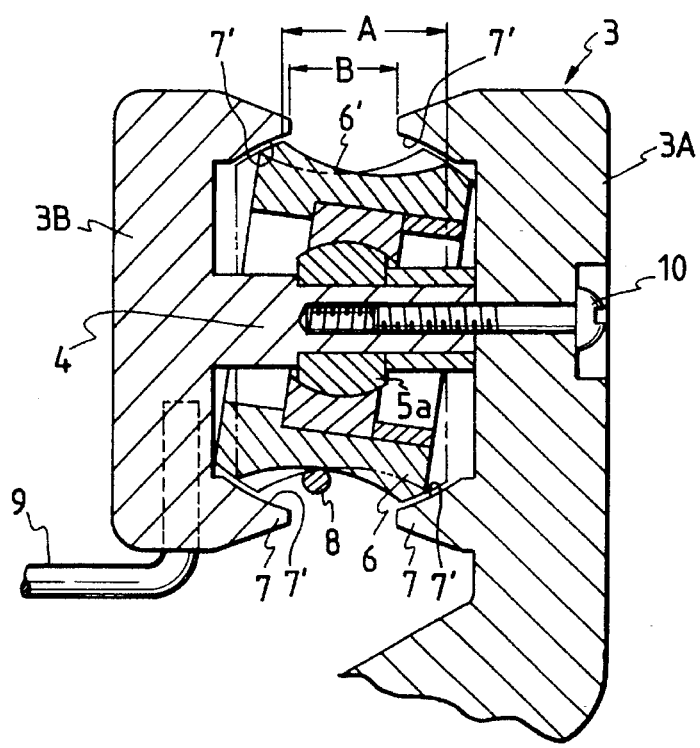
FIG. 6 is a cross-sectional view showing major parts of a fishline guide mechanism according to a fourth embodiment of the invention.

FIG. 6 shows still another embodiment in which the inner circumferential surface 7' is so designed as to gradually decrease a distance therefrom to the end of the fishline guide portion 6' as the end of the guide surface 6' is moved inward. In this embodiment, when the fishline guide roller is tilted, a distance between the inner circumferential surface of the annular projection 7 and the one of the ends of the fishline guide portion 6' is decreased while a distance between the inner circumferential surface of the annular projection 7 and the other of the ends of the fishline guide portion 6' is increased. It may be appreciated that the one of the ends of the fishline guide portion 6' is brought into contact with the corresponding annular projection when tilted further 7.

Figure 7:
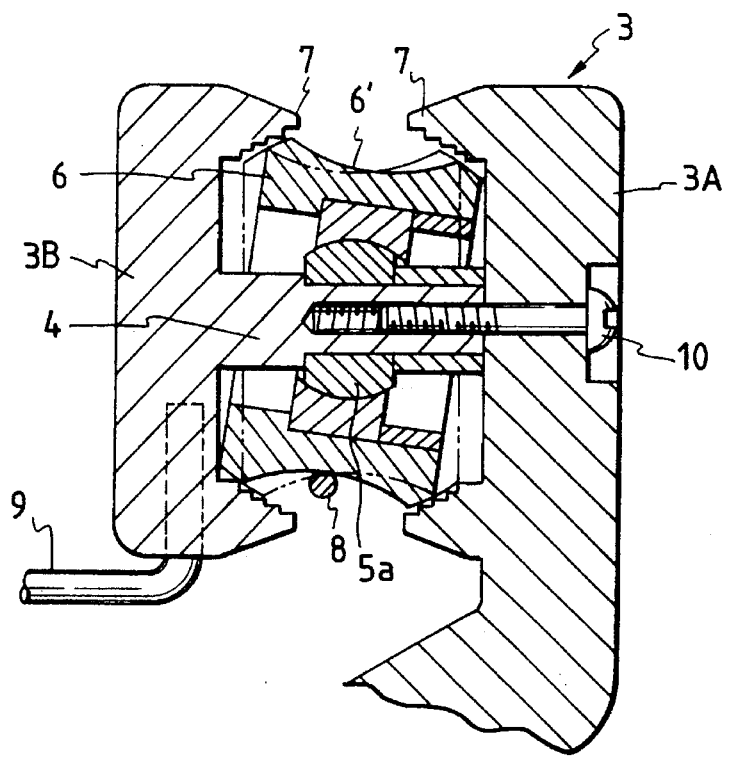
FIG. 7 is a cross-sectional view showing major parts of a fishline guide mechanism according to a fifth embodiment of the invention.

FIG. 7 shows further another embodiment in which the surface 7' is formed in a step-wise manner.

Figure 8:
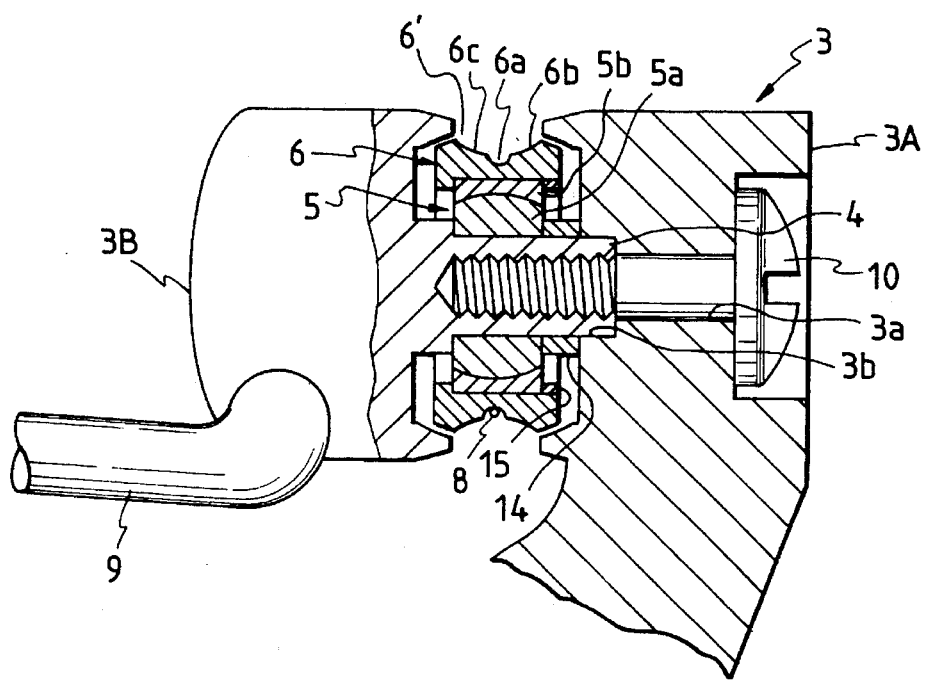
FIGS. 8 and 9 are cross-sectional views showing a modification for the first embodiment.
Figure 9:
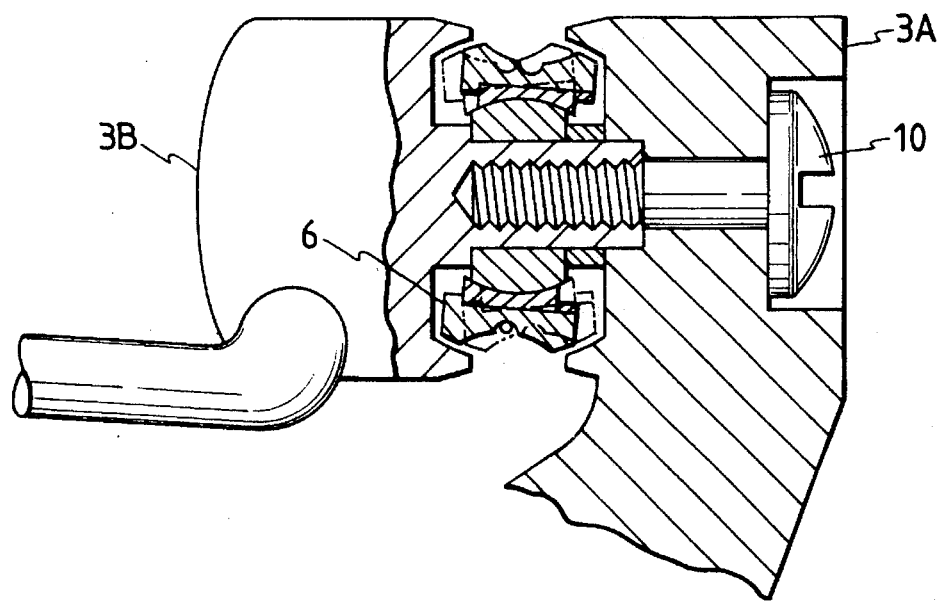

FIGS. 8 and 9 show a modification for the first embodiment shown in FIGS. 1–3, in which a U-shaped groove in cross-section is formed in the fishline guide roller 6 at its central portion so that the fishline guide surface 6' is made up of a fishline guide main portion 6a and auxiliary portions 6b and 6c located at both sides of the main portion 6a. When the bail support member 3 is pivoted relative to the support arm 2 from a fishline unwinding position to a fishline winding position, the fishline 8 is led to the guide roller 6. The fishline led to the guide roller 6 is immediately falls within the fishline guide main portion 6a by the virtue of the auxiliary portions 6b and 6c. The fishline guide main portion 6a in the form of groove can prevent the fishline 8 from rolling and sliding on and over the fishline guide portion 6' in the lateral direction when the fishline 8 is guided by the roller 6. Thus, the fishline 8 is free from twisting, becoming vicious, tangling and being accidentally cut. In addition, the support shaft 4 of the second support member 3B is fitted in a large diameter portion 3b of the through hole 3a. In this modification, the main portion 6a in the form of the groove is located at substantially central portion of the fishline guide portion 6'. However, the main portion 6a may be located at a biased position nearer to one of the ends of the fishline guide portion 6' than the other. Also, this modification may be applied to other embodiments shown in FIGS. 4–7.

Figure 10:
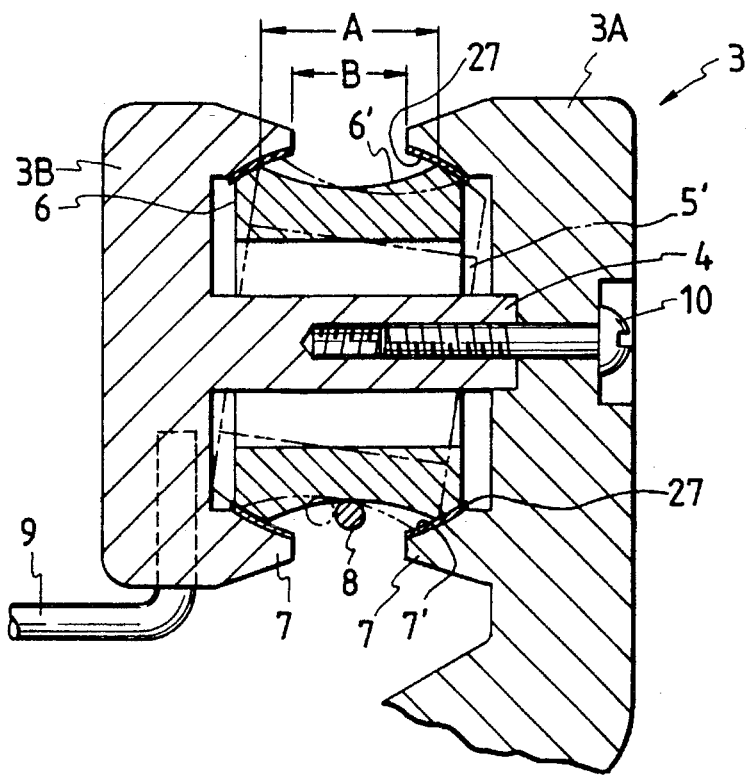
FIG. 10 is a cross-sectional view showing another modification for the first embodiment.

FIG. 10 shows another modification for the first embodiment shown in FIG. 1–3, in which a clearance is not formed between the inner circumferential surface 7' of the projection 7 and the corresponding lateral end of the fishline guide surface 6'. That is, the lateral end of the fishline guide surface 6' is brought into contact with the inner circumferential surface 7' of the projection 7 at all times. Preferably, a low-friction coating 27 is applied to both of or at least one of the inner circumferential surface 7' and a portion of the guide roller 6 at and in the vicinity of the lateral end, which portion is brought into contact with the inner circumferential surface. Owing to this construction, it is possible to dispense with a bearing-type support system provided on the support shaft 4 in the former-embodiments since the inner circumferential surface 7' rotatably and tiltably can support the guide roller 6 within a space defined in the bail support member 3. This modification may be also applied to other embodiments shown in FIGS. 4–7.

According to the present invention, in an automatic alignment system for a spinning reel where a guide roller is arranged to be tiltable about a center of its rotation, a distance defined between lateral ends of a guide roller fishline guide surface is made greater than a distance between opposing ends of annular projections respectively formed in first and second parts of a bail support member, and further a clearance between an inner surface of each annular projection and the corresponding lateral end of the fishline guide surface is made constant even when the guide roller is tilted. Therefore, a fishline is surely prevented from coming off from the fishline guide surface, entering or clogging into the clearance between the bail support member and the guide roller, tangling on components of the guide mechanism, and raising out of the fishline guide surface onto the support member. Thus, the arrangement of the present invention can ensure the smooth fishline winding operation of the spinning reel.

What is claimed is:

1. A fishline guide mechanism in which a fishline is guided on a rotatable guide roller which is supported on a bail support member by tilt means for varying its rotational axis depending on a direction of force applied to the fishline, said rotatable guide roller comprising a guide surface being defined by a concave surface having lateral ends and end surfaces extending from each of said lateral ends in a direction angled with respect to said rotational axis, said support member having a pair of annular projections opposite to each other and defining inner surfaces opposite to said end surfaces of the guide roller, wherein:

a first distance defined between said lateral ends of said guide surface is greater than a second distance defined between opposing distal ends of said annular projections; and a clearance defined between one of said inner surfaces of said annular projections and corresponding one of said lateral ends of said guide surface is maintained at substantially the same constant amount even when said guide roller is tilted relative to said support member such that the inner surfaces of the annular projections and the corresponding one of the lateral ends of the guide surface are maintained in a spaced relationship and out of contact with one another.

2. The mechanism according to claim 1, wherein each of said inner surfaces of said projections is formed as a part of a circle whose center is coincident with the rotational and tilting center of said guide roller.

3. The mechanism according to claim 1, wherein said guide surface includes a fishline guide main portion in the form of groove and auxiliary portions located at both side of said main portion, through which said fishline is guided into said main portion.

4. A fishline guide mechanism in which a fishline is guided on a guide surface of a rotatable guide roller which is supported on a bail support member so as to be tiltable about its rotational center depending on a direction of force applied to the fishline, said guide surface having lateral ends, and said support member having a pair of annular projections opposite to each other and defining inner surfaces opposite to said guide roller, wherein:

a first distance defined between said lateral ends of said guide surface is greater than a second distance defined between opposing distal ends of said annular protections; and a clearance defined between one of said inner surfaces of said annular projections and corresponding one of said lateral ends of said guide surface is maintained at substantially the same constant amount even when said guide roller is tilted relative to said support member such that the inner surfaces of the annular projections and the corresponding one of the lateral ends of the guide surface are maintained in a spaced relationship and out of contact with one another.

5. The mechanism according to claim 4, wherein each of said inner surfaces of said projections is formed as a part of a circle whose center is coincident with the rotational and tilting center of said guide roller.

6. A fishline guide mechanism for guiding a fishline, said fishline guide mechanism comprising:

a bail support member, said support member having a pair of annular projections extending toward one another and separated by a first distance, each of said pair of annular projections including an interior surface;

a guide roller rotatable about an axis of rotation and including a concave guide surface contiguous with the fishline, said guide surface terminating at axially lateral ends separated by a second distance, each of said axially lateral ends confronts a corresponding said interior surface;

a support means for supporting said guide roller within said interior surfaces of said pair of annular projections of said bail support member;

tilt means for varying the orientation of said axis of rotation with respect to said bail support member; and said first distance between said annular projections is less than said second distance between said axially lateral ends, wherein said interior surfaces are angled with respect to said axis of rotation such that a clearance between said inner surfaces and said lateral ends is maintained at a substantially constant distance when said guide roller is tilted with respect to said support member such that the inner surfaces of the annular projections and the corresponding one of the lateral ends of the guide surface are maintained in a spaced relationship and out of contact with one another.

7. The fishline guide mechanism according to claim 6, wherein said interior surfaces are portions of a sphere centered at an intersection of tilting and rotating for said guide roller.

8. A fishline guide mechanism according to claim 6, wherein;

said bail support member includes;
a support shaft disposed coaxially to and between each of said annular projections and having an inner race member coaxially and fixedly mounted thereto, said inner race member having an external surface; and said tilt means includes;
an outer race member fixedly and internally coaxially mounted to said guide roller, said outer race having an interior surface which bears against said exterior surface of said inner race member such that said outer race member is capable of tilting about an axis transverse to and rotatable about said axis of rotation of said guide roller.

9. A fishline guide mechanism according to claim 6, wherein;

said bail support member includes;
a first and second member to support each of said pair of annular projections;
a pair of center pins one each mounted to said first and second member, said pair of center pins each coaxially aligned with both of said annular projections and extending toward one another, said pair of center pins each having a interior semi-spherical surface facing one another;

said tilt means including;
a spherical member fixedly and centrally mounted within said guide roller and between each of said center pins, said spherical member having an external surface which bears against each of said interior semi-spherical surfaces such that said spherical member is capable of tilting about an axis transverse to, and rotatable about, said axis of rotation of said guide roller.

* * * * *